US011416053B2

(12) United States Patent
Frederick et al.

(10) Patent No.: US 11,416,053 B2
(45) Date of Patent: Aug. 16, 2022

(54) OPERATING MODES OF A COMPUTER DISPLAY

(71) Applicant: Hewlett-Packard Development Company, L.P., Spring, TX (US)

(72) Inventors: John W. Frederick, Spring, TX (US); Greg Staten, Spring, TX (US); Wen-Shih Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/043,228

(22) PCT Filed: Jul. 31, 2018

(86) PCT No.: PCT/US2018/044672
§ 371 (c)(1),
(2) Date: Sep. 29, 2020

(87) PCT Pub. No.: WO2020/027814
PCT Pub. Date: Feb. 6, 2020

(65) Prior Publication Data
US 2021/0149467 A1 May 20, 2021

(51) Int. Cl.
*G06F 1/00* (2006.01)
*G06F 1/26* (2006.01)
*G06F 1/3218* (2019.01)
*G09G 5/00* (2006.01)
*G06F 1/3203* (2019.01)

(52) U.S. Cl.
CPC ............ *G06F 1/266* (2013.01); *G06F 1/3218* (2013.01); *G09G 5/003* (2013.01); *G06F 1/3203* (2013.01); *G09G 2330/021* (2013.01); *G09G 2330/12* (2013.01)

(58) Field of Classification Search
CPC ...... G06F 1/266; G06F 1/3218; G06F 1/3265; G09G 5/003; G09G 2330/021; G09G 2330/12; Y02D 10/00
USPC ....................................................... 713/300
See application file for complete search history.

(56) References Cited

U.S. PATENT DOCUMENTS

| 6,498,460 | B1 | 12/2002 | Atkinson |
| 7,366,921 | B2 | 4/2008 | Ranganathan |
| 7,853,818 | B2 | 12/2010 | Nguyen |
| 8,165,724 | B2 | 4/2012 | Kerofsky |
| 8,294,307 | B2 * | 10/2012 | Tsai ........................ G06F 1/266 |
| | | | 307/150 |
| 8,358,273 | B2 | 1/2013 | Hodge et al. |

(Continued)

FOREIGN PATENT DOCUMENTS

WO WO-2001039167 A1 5/2001

*Primary Examiner* — Volvick Derose
(74) *Attorney, Agent, or Firm* — Hanley Flight & Zimmerman LLC (57) ABSTRACT

An example power controller includes a comparator to compare an amount of power supplied at a port of a display device to a first power threshold corresponding to a first operating mode of the display device and a second power threshold corresponding to a second operating mode of the display device. The first power threshold is different from the second power threshold. The power controller further includes a mode controller to configure the display device to operate in at least one of the first operating mode or the second operating mode based on an output of the comparator.

14 Claims, 5 Drawing Sheets

(56) References Cited

U.S. PATENT DOCUMENTS

| | | | |
|---|---|---|---|
| 8,904,220 B2 | 12/2014 | Saba | |
| 9,524,092 B2* | 12/2016 | Ren | G09G 3/3406 |
| 9,898,025 B2 | 2/2018 | Li et al. | |
| 10,739,800 B2* | 8/2020 | Mejia | G05F 1/573 |
| 2007/0182452 A1* | 8/2007 | Shibata | H04L 25/0276 |
| | | | 326/82 |
| 2008/0316164 A1 | 12/2008 | Tan | |
| 2011/0063501 A1* | 3/2011 | Bar-Niv | G09G 5/006 |
| | | | 348/474 |
| 2011/0102411 A1* | 5/2011 | Chang | G09G 3/3406 |
| | | | 345/212 |
| 2012/0254633 A1* | 10/2012 | Vilhauer | G06F 1/3206 |
| | | | 713/300 |
| 2012/0265911 A1* | 10/2012 | Connolly | G06F 13/387 |
| | | | 710/300 |
| 2013/0191674 A1 | 7/2013 | Sultenfuss et al. | |
| 2014/0327833 A1* | 11/2014 | Kabuto | H04N 5/63 |
| | | | 348/730 |
| 2014/0359319 A1* | 12/2014 | Baker | H01R 29/00 |
| | | | 713/300 |
| 2015/0185804 A1* | 7/2015 | Jun | G06F 1/3209 |
| | | | 713/310 |
| 2015/0301587 A1* | 10/2015 | Chae | G06F 1/324 |
| | | | 713/323 |
| 2016/0070325 A1* | 3/2016 | Kobayashi | G06F 1/266 |
| | | | 713/310 |
| 2016/0241148 A1 | 8/2016 | Kizilyalli et al. | |
| 2017/0212580 A1* | 7/2017 | Tsuji | G06F 1/3203 |
| 2018/0275734 A1* | 9/2018 | Chen | H01R 13/665 |
| 2019/0018465 A1* | 1/2019 | Whitby-Strevens | |
| | | | G06F 1/3215 |
| 2019/0129492 A1* | 5/2019 | Chen | G06F 1/266 |

\* cited by examiner

OPERATING MODES OF A COMPUTER DISPLAY

BACKGROUND

In recent years, the proliferation of mobile/portable electronic devices has led to an ever-increasing need for battery charging mechanisms. One such mechanism includes the USB Type C connector. The USB Type C connector/port enables the transmission of audio, data, video as well as the delivery of power to many types of electronic devices. Computers and other electronic devices that feature such USB Type C ports, when coupled to a power adaptor connected to a power supply, enable the supply of power to other electronic device(s) via the USB Type C ports.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

The proliferation of mobile electronic devices has caused a proliferation of battery charging devices. Many mobile electronic device users have become frustrated with having to purchase and carry around different types of chargers for a myriad of mobile electronic devices. Devices having USB Type C ports provide a charging solution that reduces the need to carry multiple battery chargers by permitting the coupling and charging of many different electronic devices via the USB Type C ports. For example, notebooks and/or laptops having USB Type C ports can be used to charge tablets, mobile telephones, video gaming devices, etc. The notebook/laptop need only be coupled to an electrical outlet via a power adaptor. The power adaptor supplied energy is then used to power/operate not only the notebook/laptop but also to energize electronic devices coupled to the notebook/laptop via the USB Type C port(s) of the notebook/laptop.

Video display devices may include USB Type C ports to enable power delivery to coupled electronic devices. Video display devices that offer such power delivery ports may be sold with higher rated, (and often higher cost) power adaptors that enable the delivery of power to coupled electronic devices. Such video display devices are configured to draw a larger amount of current/power than video display devices that do not include the power delivery option. As a result, the video display devices that do not offer power delivery ports are typically sold with lower-rated, lower cost power adaptors.

Example methods, apparatus and articles of manufacture disclosed herein enable the automatic configuration of power delivery capabilities of a display device based on sensing/detecting an amount of power supplied to a port of the display device. Some example devices disclosed herein sense an amount of power delivered to the display device via a power adaptor coupled to the display device via a port. Based on the amount of power, the display device is configured to operate in either of a first operating mode or a second operating mode. The first operating mode is different from the second operating mode. In some examples, the first operating mode is associated with a lower amount of power corresponding to a first threshold and the second operating mode is associated with a higher amount of power corresponding to a second threshold. In some examples, a sensor configured to sense the power delivered to port performs load testing to identify the amount of power. In some examples, the sensor configured to sense the power delivered to port reads information supplied on an input pin of the port. In some examples, sensors determine when other electronic device(s) are coupled to other port(s) of the display device. In some such examples, a power controller determines whether there is sufficient power supplied by the adaptor to energize the other device(s) and the display device. If so, the power controller causes a switch to enable ports by which the electronic devices are coupled to the display device. If not, the power controller causes the switch to disable the ports.

The ability to automatically configure a display device based on an amount of power sensed at a port provides a number of advantages. In particular, the display devices having the power controller disclosed herein can be sold with either a lower-rated, lower cost adaptor or a higher-rated, higher cost adaptor, thereby offering the consumer greater flexibility. Further, a user who opts for the lower-rated, lower cost adaptor, can later decide to upgrade to the high-rated, higher cost adaptor without having to purchase a new display device. In addition, because the display devices having the power controller disclosed herein are able to configure the operation of the display device automatically based on the amount of power sensed at a port of the device, either type of power adaptor can be coupled to the display devices without risk of overheating or otherwise damaging the power adaptor.

Figure 1:
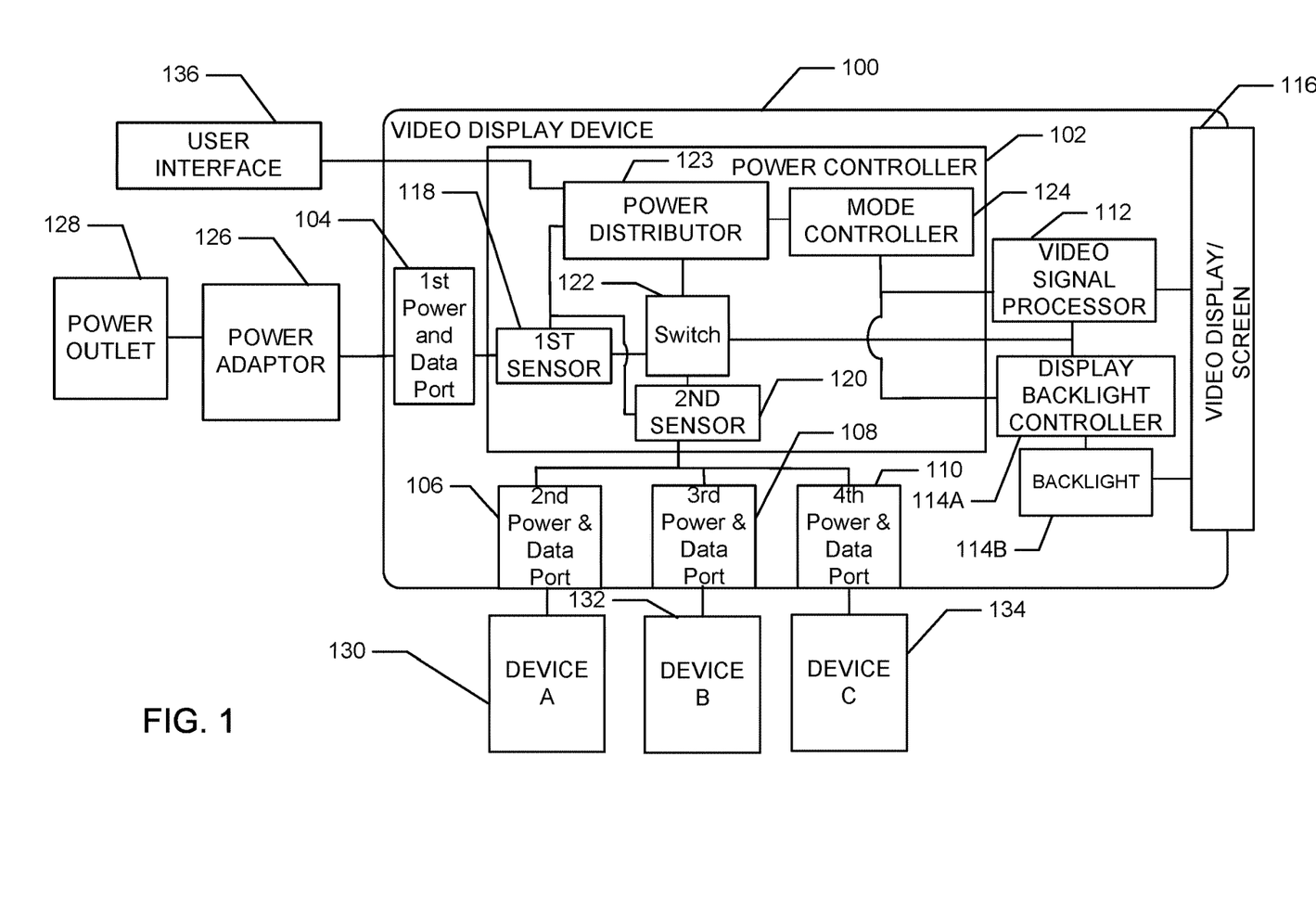
FIG. 1 is a block diagram of an example implementation of an example video display device having an example power controller in accordance with the teachings disclosed herein.

FIG. 1 is a block diagram of an example implementation of a video display device 100 having an example power controller 102, an example first power and data port 104, an example second power and data port 106, an example third power and data port 108, an example fourth power and data port 110, an example video signal processor 112, an example display backlight controller 114A, an example backlight 114B, and an example video display/screen 116. In some examples, the example power controller 102 includes an example first sensor 118, an example second sensor 120, an example switch 122, an example power distributor 123, and an example mode controller 124. The video display device 110 receives at the first power and data port 104 from a power adaptor power 126 coupled to a power outlet 128. The power adaptor 126 can be implemented with either a first type of power adaptor that is rated to supply a first amount of power or a second type of power adaptor that is rated to supply a second amount of power. In some examples, the first amount of power associated with the first type of power adaptor is lower than the second amount of power associated with the second type of power adaptor.

In some examples, a first electronic device 130, DEVICE A, is coupled to the second power and data port 106, a second electronic device 132, DEVICE B, is coupled to the third power and data port 108, and a third electronic device 134, DEVICE C, is coupled to the fourth power and data port 110. The DEVICE A 130, the DEVICE B 132, and the DEVICE C 134 are mobile electronic devices that include rechargeable batteries. In some examples, the DEVICE A 130, the DEVICE B 132, and the DEVICE C 134 can be implemented using mobile telephones, video gaming devices, tablets, laptops, iPad™ devices, etc. In some examples, power supplied by the power adaptor 126 to the example first power and data port 104 is routed via the example power controller 102 to the DEVICE A 130, the DEVICE B 132, and/or the DEVICE C 134 via the example second power and data port 106, the example third power and data port 108, and the example fourth power and data port 110, respectively.

In some examples, the example first sensor 118 of the example power controller 102 senses an amount of power received at the first power and data port 104. The first sensor 118 identifies the amount of power supplied to the example power distributor 123. In some examples, the power distributor 123 determines whether the amount of power satisfies a first power threshold corresponding to a first operating mode of the display device 100 or a second power threshold corresponding to a second operating mode of the display device 100. When the amount of power satisfies the first power threshold but does not satisfy the second power threshold, the power distributor 123 notifies the example mode controller 124, which responds by causing the example video processor 112 and the example backlight 114B to operate in a first operating mode. In some examples, the first operating mode is a basic operating mode in which the backlight 114B used to light the display screen 116 is not permitted to be lit beyond a threshold level. Further, the basic operating mode may limit the capabilities of the video processor 112. When configured to operate in the first/basic operating mode, the backlight 114A and the video processor 112 are configured to draw an amount of power equal to or less than the first power threshold level from the first power and data port 104 via the example switch 112. In some examples, the mode controller 124 adjusts the operating mode of the backlight 114B by instructing backlight controller 114A, which responds by changing the light setting of the backlight 114B.

In some examples, when the amount of power sensed by the first sensor 118 satisfies the first power threshold and the second power threshold, the power distributor 123 notifies the example mode controller 124 which responds by causing the example video processor 112 and the example backlight 114B (via the example backlight controller 114A) to operate in a second operating mode. In some examples, the second operating mode is an enhanced operating mode in which the backlight used to light the display screen is permitted to be lit to its maximum level. Further, when operating in the enhanced operating mode the video signal processor may have an expanded set of capabilities. When configured to operate in the second/enhanced operating mode, the backlight 114B and the video processor 112 are configured to draw an amount of power equal to or less than the second power threshold level from the first power and data port 104 via the example switch 112.

Thus, the video display device 100 is configured to operate in either a first/basic operating mode or a second/enhanced operating mode depending on the amount of power supplied by the power adaptor 126 at the first power and data port 104. In some examples, the first power threshold is equal to the first amount of power supplied by the first type of power adaptor and the second power threshold is equal to the second amount of power supplied by the second type of power adaptor. As such, instead of being able to operate with only one type of power adaptor 126 (as are conventional display devices) the video display device 100 having the power controller 102 is able to operate with either of a lower-rated power adaptor 126 or a higher-rated power adaptor 126.

In some examples, after the example mode controller 124 of the example power controller 120 has automatically configured the operating mode of the video display device 100 based on the amount of power at the example first power and data port 104, the example second sensor 120 determines that a device, e.g., the example DEVICE A 130, is attempting to draw power from the first power and data port 104 (or has requested to draw such power). In some examples, the second sensor 120 notifies the example power distributor 123, which responds by determining whether the amount of power supplied to the first power and data port 104 is sufficient to supply the requested power to the DEVICE A 130 while also continuing to operate the display device 100 in an operating mode (e.g., either the first operating mode or the second operating mode) currently being used by the display device 100. If the power distributor determines the amount of power supplied to the first power and data port 104 is sufficient to supply the requested amount of power to the DEVICE A 130, while also continuing to operate the display device 100 in the current operating mode, the power distributor 123 instructs the example switch 122 to enable a power supply capability of the second power and data port 106. In some examples, when the power supply capability of the second power and data port 106 is enabled, power begins to flow from the first power and data port 104 through the switch 122 to the second power and data port 106 for consumption by the DEVICE A 130.

In some examples, when the power distributor 123 determines the amount of power supplied to the first power and data port 104 is not sufficient to supply the requested amount of power to the DEVICE A 130, while also continuing to operate the display device 100 in the current operating mode, the example power distributor 123 determines whether the display device 100 is currently operating in the second operating mode. When the power distributor 123 determines the display device 100 is currently operating in the second operating mode, the power distributor 123 can determine whether the amount of power supplied to the first power and data port 104 is sufficient to supply the requested amount of power to the DEVICE A 130, while operating the display device 100 in the first operating mode. If the power distributor 123 determines the amount of power supplied to the first power and data port 104 is sufficient to supply the requested amount of power to the DEVICE A 130, while operating the display device 100 in the first operating mode, the power distributor 123 instructs the mode controller 124 to automatically re-configure the display device 100 to operate in the first operating mode. In response, the mode controller 124 causes the example video signal processor 112 and the example display backlight to begin drawing an amount of power less than or equal to the first power threshold. In addition, the power distributor 123 instructs the example switch 122 to enable a power supply capability of the second power and data port 106 and power begins to flow from the first power and data port 104 through the switch 122 to the second power and data port 106 for consumption by the DEVICE A 130.

In some examples, the example DEVICE B 132, and/or the example DEVICE C 134 are additionally coupled to the video display device 100 via the third and fourth power and data ports 108, 110, respectively. In some such examples, the second example sensor 120 identifies an amount of power required by DEVICE B 132 and DEVICE C 134 and determines whether there is sufficient power available at the first power and data port 104 to supply the DEVICE B 132 and the DEVICE C 134 while also operating the video display 116 at the current operating mode. As described with respect to the example DEVICE A 130, depending on the amount of available power at the first power and data port 104, the power distributor 123 causes the switch 122 to enable or disable the third and fourth power and data ports 108, 110 accordingly. Additionally, the power distributor 123 can automatically reduce or increase the operating mode of the display device 100 to accommodate the power required by the DEVICE A 130, the DEVICE B 132, and/or the DEVICE C 134.

In some examples, the example power distributor 123 determines which, if any, of the example DEVICE A 130, the example DEVICE B 132, and/or the example DEVICE C 134 is to be given power when there is insufficient power to supply the DEVICE A 13, the DEVICE B 132, and/or the DEVICE C 134. In some such examples, the power distributor 123 may consult a priority assigned to the DEVICE A 130, the DEVICE B 132, and/or the DEVICE C 134. In some examples, a user can assign, via the user interface 136, a priority to different types of devices that may be coupled to the display device 100. In some such examples, the priority information entered at the user interface 136 can be stored at the power distributor 123 for use in determining how power is to be distributed among the DEVICE A 130, the DEVICE B 132, and/or the DEVICE C 134. In some examples, the user may be asked to specify a desired priority among different types of devices during an initial configuration of the display device 100. In some examples, the user may be asked to specify a desired priority among different types of devices each time a new type of device is coupled to the display device 100 or at any other time in a periodic or aperiodic manner.

In some examples, the example first power and data port 104, the example second power and data port 106, the example third power and data port 108, and the example fourth power and data port 110 are implemented with USB Type C ports. In some such examples, the first power and data port 104, the second power and data port 106, the third power and data port 108, and the fourth power and data port 110 include a set of pins by which data flow and power flow are enabled. In some such examples, the example switch 122 enables the flow of power via any of the first power and data port 104, the second power and data port 106, the third power and data port 108, and the fourth power and data port 110 by activating the pin(s). Further, in some examples, the first sensor 118 can identify an amount of power supplied at the first power and data port 104 by detecting information supplied on the pin(s) regarding the capabilities of the example power adaptor 126. Likewise, in some examples, the second sensor 120 can identify the amount of power requested by, drawn by, required by the DEVICE A 130, the DEVICE B 132, and/or the DEVICE C 134 by reading information supplied by the pin(s) designated to carry data. In some examples, the DEVICE A 130, the DEVICE B 132, and/or the DEVICE C 134 can transmit information via the pin(s) of the second power and data port 106, the third power and data port 108, and the fourth power and data port 110, respectively. The information can include, for example, a request for a specific amount of power, device identifying information, etc. In some examples, the example first power and data port 104, the example second power and data port 106, the example third power and data port 108, and the example fourth power and data port 110 are implemented with USB Type A ports. In some examples, the example first power and data port 104, the example second power and data port 106, the example third power and data port 108, and the example fourth power and data port 110 are implemented with any type of port capable of communicating data and power.

In some examples, the example first sensor 118 is implemented by a load tester. In some such examples, the first sensor 118 detects the amount of power supplied at the example first power and data port 104 by performing a load test or multiple load tests on the signal supplied at the first power and data port 104. Such load tests can be conducted to identify an amount of power available at the first power and data port 104. When the load testing is successfully completed, the first sensor 118 informs the example power distributor 123 as to the outcome of the testing, and the power distributor instructs the example mode controller 124 to configure the display device based on the outcome.

Figure 2:
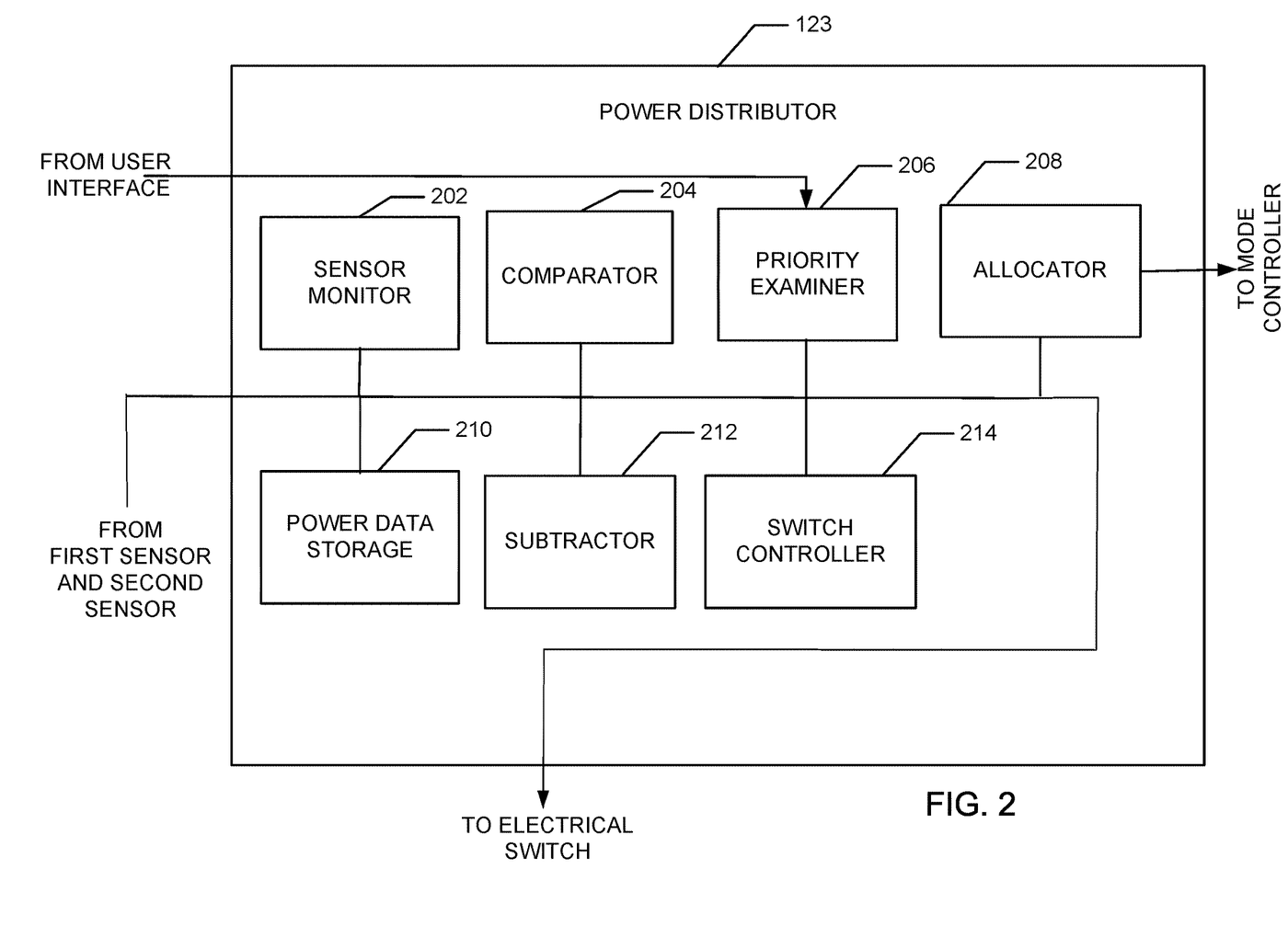
FIG. 2 is a block diagram of an example implementation of an example power distributor of the example power controller of FIG. 1.

FIG. 2 is a block diagram of an example implementation of the example power distributor 123 of FIG. 1. In the illustrated example, the power distributor 123 includes an example sensor monitor 202, an example power comparator 204, an example priority examiner 206, an example allocator 208, an example power data storage 210, an example subtractor 212, and an example switch controller 214. In some examples, the sensor monitor 202 monitors information supplied by the example first sensor 118 and the example second sensor 120. As described above, the information supplied by the example first sensor 118 can include information identifying an amount of power supplied by the power adaptor 126 to the example first power and data port 104. Further, information supplied by the second sensor 120 can include requests for power received from any of the devices coupled to the display device 100 (e.g., the example DEVICE A 130, the example DEVICE B 132, and/or the example DEVICE C 134), and/or device type information for any or all of the DEVICE A 130, the DEVICE B 132, and/or the DEVICE C 134. In some examples, the sensor monitor causes all or some of the information supplied by the first sensor 118 and/or the second sensor 120 in the power data storage 210. In some examples, the sensor monitor 202 monitors the first and the second sensors 118, 120 for changes in the amount of power supplied to and/or drawn by the first power and data port 104, the second power and data port 106, the third power and data port 108, and/or the fourth power and data port 110.

In some examples, the example power comparator 204 compares the amount of power at the example first power and data port 104 to the first power threshold and to the second power threshold and notifies the example allocator 208 as to the results of the comparison. In some such examples, the allocator 208 responds to the results/output of the comparator by instructing the example mode controller 124 (see FIG. 1) to configure the operating mode of the example display device 100 (see FIG. 1). In some examples, the example subtractor 212 subtracts an amount of power requested/drawn by the example video signal processor 112 and/or the example DEVICE A 130, the example DEVICE B 132, and/or the example DEVICE C 134 from an amount of power available at the first power and data port 104 to determine whether there is sufficient power for the DEVICE A 130, the DEVICE B 132, and/or the DEVICE C 134. In some such examples, the subtractor supplies the results of such a subtraction operation to the allocator 208 for use in allocating power to the display device 100, the DEVICE A 130, the DEVICE B 132, and/or the DEVICE C 134.

In some examples, the example priority examiner 206 examines a priority assigned to the DEVICE A 130, the DEVICE B 132, and/or the DEVICE C 134 to identify which, if any, of the devices has priority over any of the others with respect to power consumption. In some examples, the user interface 136 supplies priority information entered by a user to the priority examiner 206. The priority examiner 206 may retain the information or may cause the priority information to be stored in the example power data storage 210. In some examples, the priority examiner 206 notifies the allocator 208 as to which, if any, of the DEVICE A 130, the DEVICE B 132, the DEVICE C 134 has priority over the others. The allocator 208 then allocates power to the devices (any or all of the DEVICE A 130, the DEVICE B 132, the DEVICE C 134) based on the priority information. In some examples, the allocator 208 uses information supplied by the sensor monitor 202, the power comparator 204, the subtractor 212, the priority examiner 206, and information stored in the power data storage 210 to allocate power among the display device 100, the DEVICE A 130, the DEVICE B 132, and the DEVICE C 134. The allocator 208 then instructs the example mode controller 124 and/or the example switch controller 214 to take action based on the allocations in the manner described above with reference to FIG. 1.

While an example manner of implementing the example display device 100 having the example power controller 102 is illustrated in FIG. 1 and FIG. 2, the elements, processes and/or devices illustrated in FIGS. 1, and FIG. 2 may be combined, divided, re-arranged, omitted, eliminated and/or implemented in any other way. Further, the example video signal processor 112, the example display backlight controller 114A, the example backlight 114B, the example first sensor 118, the example second sensor 120, the example switch 122, the example power distributor 123, the example mode controller 124, the example sensor monitor 202, the example power comparator 204, the example priority examiner 206, the example allocator 208, the example power data storage 210, the example subtractor 212, the example switch controller 214 and/or, more generally, the display device 100 having the power controller 102 may be implemented by hardware, software, firmware and/or any combination of hardware, software and/or firmware. Thus, for example, any of the example video signal processor 112, the example display backlight controller 114A, the example backlight 114B, the example first sensor 118, the example second sensor 120, the example switch 122, the example power distributor 123, the example mode controller 124, the example sensor monitor 202, the example power comparator 204, the example priority examiner 206, the example allocator 208, the example power data storage 210, the example subtractor 212, the example switch controller 214, and/or, more generally, the example display device 100 having the power controller 102 of FIG. 1 and FIG. 2 could be implemented by analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example video signal processor 112, the example display backlight controller 114A, the example backlight 114B, the example video display/screen 116, the example first sensor 118, the example second sensor 120, the example switch 122, the example power distributor 123, the example mode controller 124, the example sensor monitor 202, the example power comparator 204, the example priority examiner 206, the example allocator 208, the example power data storage 210, the example subtractor 212, the example switch controller 214, and/or the example display device having the example power controller 102 of FIG. 1 and FIG. 2 is/are hereby expressly defined to include a non-transitory computer readable storage device or storage disk such as a memory, a digital versatile disk (DVD), a compact disk (CD), a Blu-ray disk, etc. including the software. Further still, the example display device 100 having the example power controller 102 of FIG. 1 and FIG. 2 may include elements, processes and/or devices in addition to, or instead of, those illustrated in FIG. 1 and FIG. 2, and/or may include more than one of any or all of the illustrated elements, processes, and devices.

Figure 3:
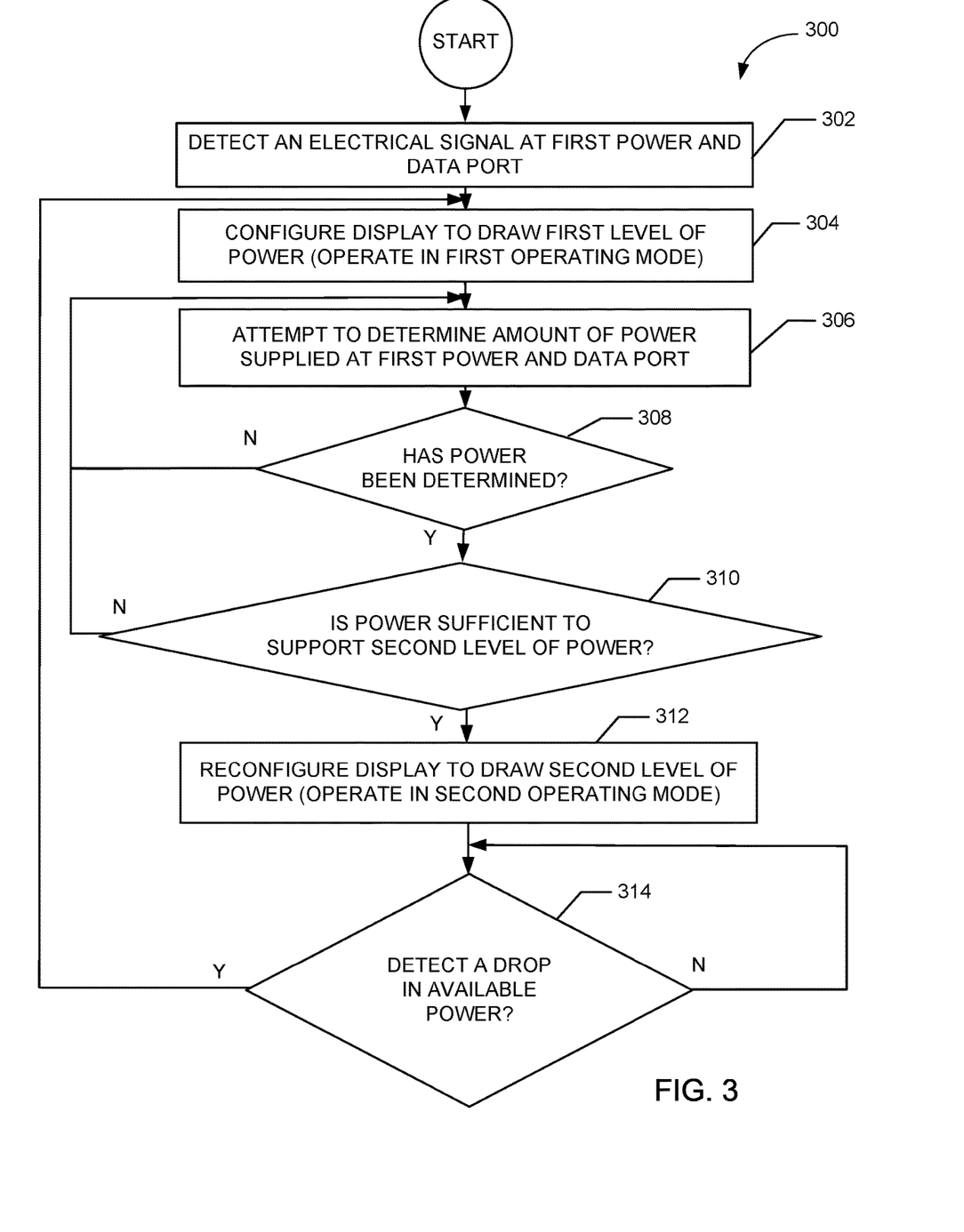
FIG. 3 is a flow chart representative of example machine readable instructions which may be executed to implement the example display device having the example power controller of FIG. 1.
Figure 4:
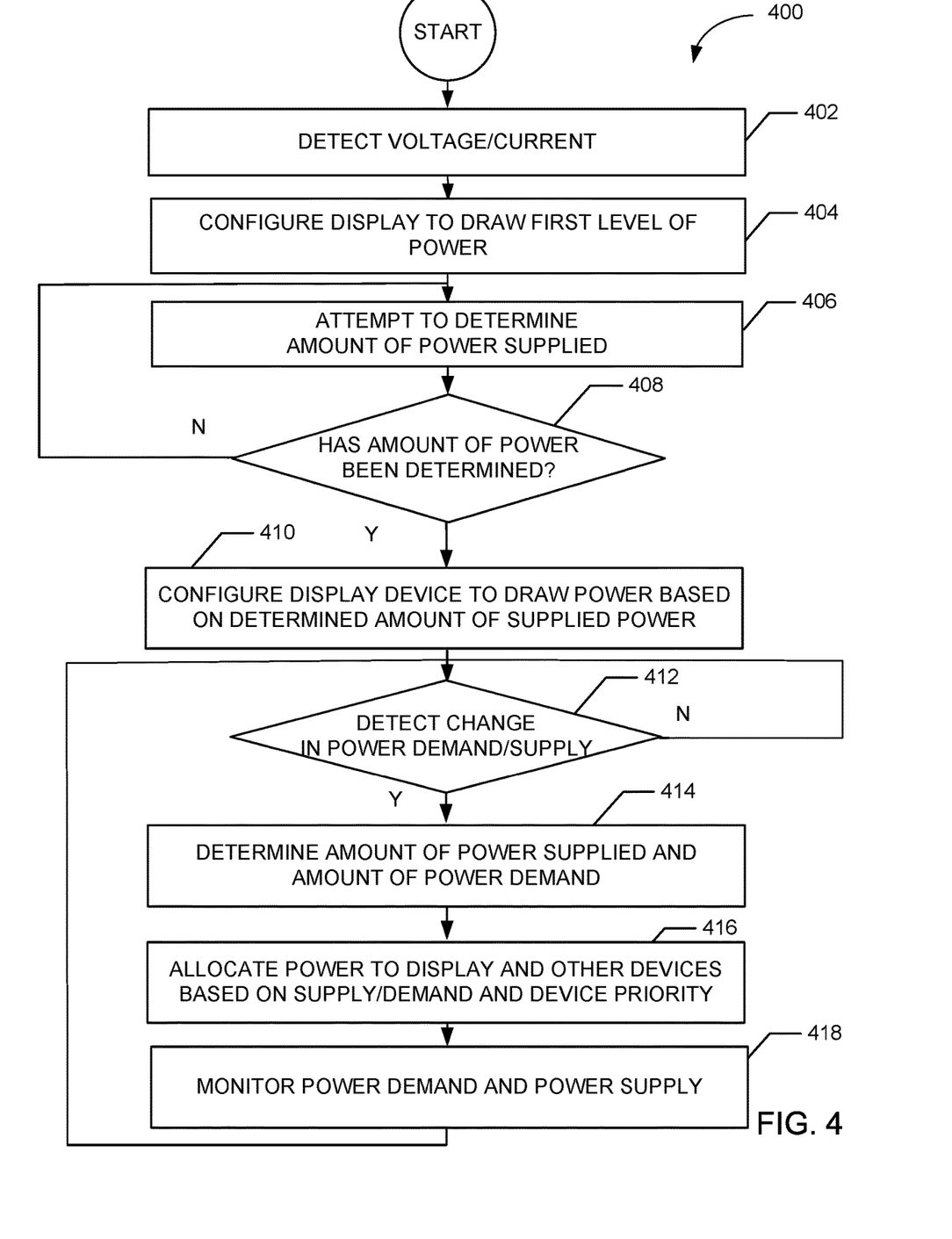
FIG. 4 is a flow chart representative of example machine readable instructions which may be executed to implement the example display device having the example power controller of FIG. 1 and FIG. 2.

Flowcharts representative of example machine readable instructions for implementing the display device 100 having the power controller 102 of FIG. 1 and FIG. 2 are shown in FIG. 3 and FIG. 4. In these examples, the machine readable instructions of the flowcharts of FIG. 3 and FIG. 4 comprise a program for execution by a processor such as the processor 512 shown in the example processor platform 500 discussed in connection with FIG. 5. The programs may be embodied in software stored on a non-transitory computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example programs are described with reference to the flowcharts illustrated in FIGS. 3 and 4, many other methods of implementing the example display device 100 having the power controller 102 may alternatively be used. For example, the order of execution of the blocks may be changed, and/or some of the blocks described may be changed, eliminated, or combined. Additionally or alternatively, any or all of the blocks may be implemented by hardware circuit(s) (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned, the example processes of FIGS. 3 and 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The program 300 of FIG. 3 begins when the example first sensor 118 senses an electrical signal at the example first power and data port 104 (block 302). In response to sensing the electrical signal, the power controller 102 configures the display device 100 to operate in a first operating mode (draw a first level of power) corresponding to a lower power rating/setting (block 304). In some examples, the first sensor 118 notifies the power distributor 123 of the presence of the electrical signal, and the example power distributor 123 responds to the notification by causing the example mode controller 124 to configure the display device 100 to operate in the first operating mode.

The first sensor 118 attempts to determine an amount of power available at the example first power and data port 104 (block 306). In some examples, determining the amount of power includes performing load test(s), reading information supplied on a data pin of the first power and data port 104, etc. If the attempt to determine the amount of power is not successful (as determined at block 308), the first sensor 118 returns to the block 306 and continues to attempt to determine the amount of power. If the attempt to determine the amount of power is successful (as determined at block 308), the power distributor 123 determines whether the amount of power is sufficient to support operating the display device in the second operating mode (block 310). In some examples, the example comparator 124 makes the determination by comparing the amount of power to the first power threshold corresponding to the first operating mode of the display device 100 and to the second power threshold corresponding to the second operating mode of the display device 100. When the amount of power satisfies the first power threshold but does not satisfy the second power threshold (as determined at block 310), either of the comparator 204 or the power distributor 123 notifies the example mode controller 124 which responds by causing the example video processor 112 and the example backlight 114B to continue operating in the first operating mode (block 304).

In some examples, when the amount of power sensed by the first sensor 118 satisfies the first power threshold and the second power threshold (as determined at block 310), the power distributor 123 and/or comparator 204 instructs the example mode controller 124 to cause the example video processor 112 and the example backlight 114B (via the example backlight controller 114A) to operate in the second operating mode (draw a second level of power) (block 312). The video display device 100 continues to operate in the second operating mode 314 unless and until the first sensor 118 detects a drop in the available power at the first power and data port 104 (block 314). When such a drop is detected, the program of FIG. 3 returns to the block 304 at which the power distributor 123 again instructs the mode controller 124 to configure the display device 100 to operate in the first operating mode.

Thus, according to the program of FIG. 3, the video display device 100 is configured to operate in either a first/basic operating mode or a second/enhanced operating mode depending on the amount of power supplied by the power adaptor 126 at the first power and data port 104. In some examples, the first power threshold is equal to the first amount of power supplied by the first type of power adaptor and the second power threshold is equal to the second amount of power supplied by the second type of power adaptor. As such, instead of being able to operate with only one type of power adaptor 126 (as are conventional display devices) the video display device 100 having the power controller 102 is able to operate with either of a lower-rated power adaptor 126 or a higher-rated power adaptor 126.

The program 400 of FIG. 4 is implemented in display devices that are capable of automatically configuring an operating mode of the display device based on a detected amount of power and are also capable of supplying power to other device(s). The program of FIG. 4 begins when the when the example first sensor 118 senses an electrical signal (e.g., via a sensed voltage or current) at the example first power and data port 104 (block 402). In response to sensing the electrical signal, the power controller 102 configures the display device 100 to operate in a first operating mode (draw a first level of power) corresponding to the lower power rating/setting (block 404). In some examples, the first sensor 118 notifies the power distributor 123 of the presence of the electrical signal, and the example power distributor 123 responds to the notification by causing the example mode controller 124 to configure the display device 100 to operate in the first operating mode.

The first sensor 118 attempts to determine an amount of power available at the example first power and data port 104 (block 406). If the attempt to determine the amount of power is not successful (as determined at block 408), the first sensor 118 returns to the block 406 and continues to attempt to determine the amount of power. If the attempt to determine the amount of power is successful (as determined at block 408), the power distributor 123 causes the mode controller 124 to configure the display device 100 to operate in the first operating mode or the second operating mode (e.g., to configure the display device 100 to draw power) based on the determined amount of supplied power (block 410) In some examples, configuring the display device 100 to operate in either the first or the second operating mode includes determining whether the amount of power is sufficient to support operating the display device 100 in the second operating mode by comparing the amount of power detected by the first sensor 118 to the first power threshold corresponding to the first operating mode of the display device 100 and to the second power threshold corresponding to the second operating mode of the display device 100. When the amount of power satisfies the first power threshold but does not satisfy the second power threshold, either of the comparator 204 or the power distributor 123 notifies the example mode controller 124 which responds by causing the example video processor 112 and the example backlight 114B to continue operating in the first operating mode. After configuring the display device 100, the example sensor monitor 202 of the example power distributor 123 collects sensor information from the first sensor 118 and the second sensor 120. When the sensors 118, 120 indicate a change in either power demand or supply (as determined at the block 412), the example sensor monitor 202 and/or the sensors 118, 120 supply information identifying the amount of power supplied and the amount of power demanded (block 414). In some examples, the amount of power demand and supply are stored in the power data storage 210 for reference by the example allocator 208 of the power distributor 123.

The example allocator 208 then uses the information identifying the amount of power supply, the amount of power demand, and the current operating mode of the display device 100 to allocate power among the display device 100, and devices (e.g., the DEVICE A 132, the DEVICE B 134, the DEVICE C 136) coupled to the display device 100 (block 416). In some examples, the allocator 208 instructs the subtractor 212 to subtract the amount of power demanded/requested by the device(s) coupled to the display device 100, as well as the amount of power currently being drawn by the display device 100, from the amount of power supplied by the power adaptor 126 at the first power and data port 104. In some such examples, the allocator 208 uses the results of the subtraction operation to determine whether the amount of power at the first power and data port 104 is sufficient to supply the display device 100 and the device(s) coupled to the display device 100. In some examples, when the power is sufficient to support only a subset of the devices, the allocator 208 requests the assistance of the priority examiner 206 to identify which of the device(s) are to be given priority in power allocation. The allocator 208, upon determining how the power is to be allocated, instructs the mode controller 124 to configure the operating mode of the display device 100 and instructs the switch controller 214 to control the switch 122 to enable or disable the second, third, and/or fourth power and data ports. After the allocator 208 is finished allocating the power, the sensors 118, 120 and the sensor monitor 202 continue to monitor the power demand and power supply (block 418) and when a change in either is detected at the block 412, performs the operations of the blocks 414-416 to control the distribution of power among the display device 100 and the device(s) coupled to the display device 100. The program 400 of FIG. 4 continues in this manner until the display device 100 is turned off and/or loses power.

Figure 5:
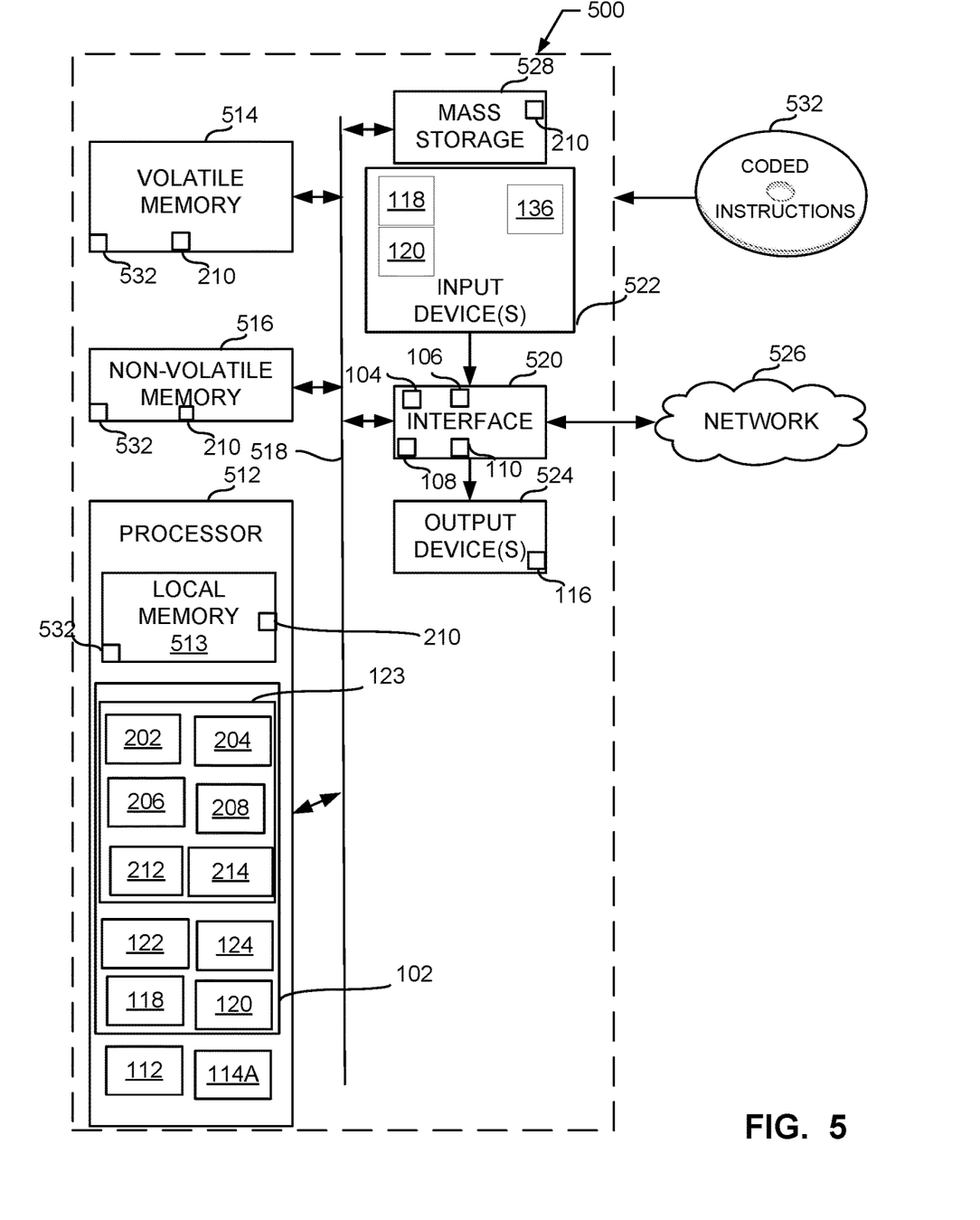
FIG. 5 is a block diagram of an example processor platform capable of executing the instructions of FIGS. 3 and 4, to implement the example computer display device having the example power controller of FIGS. 1 and 2.

FIG. 5 is a block diagram of an example processor platform 500 capable of executing the instructions of FIG. 3 and FIG. 4 to implement the display device 100 of FIGS. 1 and 2. The processor platform 500 can be, for example, a server, a personal computer, a mobile device (e.g., a cell phone, a smart phone, a tablet such as an iPad™), a personal digital assistant (PDA), an Internet appliance, a gaming console, a personal video recorder, or any other type of computing device.

The processor platform 500 of the illustrated example includes a processor 512. The processor 512 of the illustrated example is hardware. For example, the processor 512 can be implemented by integrated circuit(s), logic circuit(s), microprocessor(s), or controller(s) from any desired family or manufacturer. The hardware processor may be a semiconductor based (e.g., silicon based) device. In this example, the processor 512 implements the power distributor 123, the mode controller 124, at least a portion of the first sensor 118, at least a portion of the second sensor 120, the switch 122, the sensor monitor 202, the comparator 204, the priority examiner 206, the power allocator 208, the subtractor 212, and the switch controller 214, and/or more generally, the power controller 102. In this example, the processor 512 can also implement the video signal processor 112 and the display backlight controller 114A.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller. In some examples, the main memory is used to implement the example power data storage 210.

The processor platform 500 of the illustrated example also includes an interface circuit 520. The interface circuit 520 may be implemented by any type of interface standard, such as an Ethernet interface, a universal serial bus (USB), and/or a PCI express interface. In this example, the interface implements the first power and data port 104, the second power and data port 106, the third power and data port 108, and the fourth power and data port 110.

In the illustrated example, input device(s) 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint, and/or a voice recognition system. The input device 522 can be used to implement the user interface 136. In some examples, the input device can be used to implement at least a portion of the first sensor 118 and/or the second sensor 120.

Output device(s) 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer, and/or speakers). The interface circuit 520 of the illustrated example, thus, typically includes a graphics driver card, a graphics driver chip, and/or a graphics driver processor. The output device 524 can be used to implement the example video display screen 116.

The interface circuit 520 of the illustrated example also includes a communication device such as a transmitter, a receiver, a transceiver, a modem, and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes mass storage device(s) 528 for storing software and/or data. Examples of such mass storage devices 528 include floppy disk drives, hard drive disks, compact disk drives, Blu-ray disk drives, RAID systems, and digital versatile disk (DVD) drives. The mass storage devices 528 can be used to implement the example power data storage 210.

The coded instructions 532 of FIGS. 3 and 4 may be stored in the mass storage device 528, in the volatile memory 514, in the non-volatile memory 516, and/or on a removable tangible computer readable storage medium such as a CD or DVD.

Example methods, apparatus and articles of manufacture have been disclosed that automatically configure the operating mode of a display device based on an amount of power supplied to the display device. The disclosed technologies enable the operation of a display device with differently rated power adaptors thereby providing a display device user more flexibility in the type of display capabilities while also eliminating the risk that a power adaptor is damaged by the display device drawing more power/current than the power adaptor is rated to withstand.

Example devices, methods and apparatus disclosed herein include sensing an amount of power delivered to a display device via a power adaptor coupled to the display device via a port and, based on the amount of sensed power, configuring the display device to operate in either of a first operating mode or a second operating mode. In some examples, the display device can be configured, based on the power sensed at the port, to operate in any number of operating modes. In some such examples, the operating modes correspond to any number of power thresholds. Further the different operating modes and power thresholds can correspond to any number of different display features/capabilities. In some examples, operating modes corresponding to lower power thresholds may support a more limited number of display features than operating modes corresponding to higher power thresholds.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A power controller comprising:
   a comparator to compare a first amount of power supplied at a first port of a computer display to a first power threshold corresponding to a first operating mode of the computer display and a second power threshold corresponding to a second operating mode of the computer display, the first power threshold different from the second power threshold; and
   a mode controller to configure the computer display to operate in at least one of the first operating mode or the second operating mode based on an output of the comparator;
   a sensor monitor to determine a second amount of power to be supplied to a second port of the computer display; and
   an allocator to control a switch that is to enable or disable the second port, the allocator to control the switch based on whether the first amount of power is sufficient to provide the second amount of power to the second port when the computer display is configured to operate in the at least one of the first operating mode or the second operating mode.

2. The power controller of claim 1, wherein the first power threshold is less than the second power threshold, the first operating mode corresponds to a basic operating mode, the second operating mode corresponds to an enhanced operating mode, and the display device has fewer available display functions when operating in the basic operating mode than when operating in the enhanced operating mode.

3. The power controller of claim 1, including at least one of a first type of sensor to determine the amount of power supplied at the first port and a second type of sensor to process a control signal supplied by a power adaptor coupled to the first port to determine the amount of power supplied at the first port.

4. The power controller of claim 1, wherein the sensor monitor is to perform a load test on an electrical signal supplied by a power adaptor coupled to the first port to determine the first amount of power supplied at the first port.

5. A power controller comprising:
   a comparator to compare a first amount of power supplied at a first port of a computer display to a first power threshold corresponding to a first operating mode of the computer display and a second power threshold corresponding to a second operating mode of the computer display, the first power threshold different from the second power threshold; and
   a mode controller to configure the computer display to operate in at least one of the first operating mode or the second operating mode based on an output of the comparator;
   wherein when the computer display is configured to operate in the second operating mode, and the first amount of power supplied at the first port is insufficient to provide the second amount of power to the second port, the mode controller is to configure the computer display to operate in the first operating mode, and an allocator is to enable the second port based on whether the first amount of power is sufficient to provide the second amount of power to the second port when the computer display is configured to operate in the first operating mode.

6. A non-transitory machine readable storage medium comprising instructions which, when executed, cause a machine to at least:
   in response to an electrical signal detected at a first port of a display device, configure the display device to draw a first level of power corresponding to a first operating mode;
   determine whether a first amount of power available at the first port is sufficient to support operation of the display device in a second operating mode corresponding to a second level of power;
   in response to determining the first amount of power available at the first port is sufficient to support operation of the display device in the second operating mode, configure the display device to draw the second level of power corresponding to the second operating mode;
   determine a second amount of power to be supplied to a second port of the computer display; and
   enable or disable a second port of the computer display based on whether the first amount of power is sufficient to provide the second amount of power to the second port when the computer display is configured to operate in the at least one of the first operating mode or the second operating mode.

7. The non-transitory machine-readable storage medium of claim 6, including instructions to cause the machine to configure the display device to draw the first level of power in response to detecting a drop in the first amount of power available at the first port.

8. The non-transitory machine-readable storage medium of claim 6, wherein the first amount of power available at the first port is determined by a load tester.

9. The non-transitory machine readable storage medium of claim 6, wherein the first amount of power available at the first port is determined by processing an electrical signal supplied by a power adaptor coupled to the first port.

10. A non-transitory machine readable storage medium comprising instructions which, when executed, cause a machine to at least:
   in response to an electrical signal detected at a first port of a display device, configure the display device to draw a first level of power corresponding to a first operating mode;
   determine whether a first amount of power available at the first port is sufficient to support operation of the display device in a second operating mode corresponding to a second level of power;
   in response to determining the first amount of power available at the first port is sufficient to support operation of the display device in the second operating mode, configure the display device to draw the second level of power corresponding to the second operating mode; and enable or disable a second port of the display device based on whether the first amount of power at the first port is sufficient to support operation of the display device in the second operating mode.

11. A display device including:
a first sensor to sense a first amount of power supplied at a first port of the display device;
a power distributor to determine whether the first amount of power supplied at the first port corresponds to a first type of power adaptor or to a second type of power adaptor;
a mode controller to cause the display device to operate in a first operating mode or a second operating mode based on an output of the power distributor;
a second sensor to determine a second amount of power to be supplied to a second port of the display device; and
a switch controller to enable or disable the second port of the display device based on whether the first amount of power is sufficient to provide the second amount of power to the second port when the display device is configured to operate in the at least one of the first operating mode or the second operating mode.

12. The display device of claim 11, wherein the first sensor is a load tester.

13. The display device of claim 11, wherein the first type of power adaptor corresponds to the first operating mode and the second type of power adaptor corresponds to the second operating mode.

14. The display device of claim 11, wherein the display device has more display functions when operating in the second operating mode than when operating in the first operating mode.

* * * * *